United States Patent

Masamura

[11] Patent Number: 6,024,366
[45] Date of Patent: Feb. 15, 2000

[54] SUSPENSION APPARATUS

[75] Inventor: Tatsuya Masamura, Gifu, Japan

[73] Assignee: Kayaba Kogyo Kabushiki Kaisha, Tokyo, Japan

[21] Appl. No.: 09/005,362

[22] Filed: Jan. 9, 1998

[30] Foreign Application Priority Data

Jan. 17, 1997 [JP] Japan .................................. 9-019795

[51] Int. Cl.[7] .................................................. B60G 15/10
[52] U.S. Cl. .................................... 280/124.162; 267/217
[58] Field of Search ..................... 280/124.157, 124.158, 280/124.159, 124.16, 124.161, 124.162; 267/64.11, 64.25, 64.26

[56] References Cited

U.S. PATENT DOCUMENTS

| | | | |
|---|---|---|---|
| 3,480,269 | 11/1969 | Jewell et al. | 280/124.157 |
| 3,625,540 | 12/1971 | Jewell | 280/124.161 |
| 4,909,488 | 3/1990 | Seibert et al. | 267/64.11 |
| 5,058,868 | 10/1991 | Sirven | 267/64.26 |
| 5,080,392 | 1/1992 | Bazergui | 280/124.159 |
| 5,486,018 | 1/1996 | Sakai | 280/714 |

FOREIGN PATENT DOCUMENTS

| | | | |
|---|---|---|---|
| 2519372 | 11/1976 | Germany | 267/64.26 |
| 0079825 | 4/1991 | Japan | 267/64.11 |
| 8-132846 | 5/1997 | Japan . | |

*Primary Examiner*—Brian L. Johnson
*Assistant Examiner*—Michael Britton
*Attorney, Agent, or Firm*—McGlew and Tuttle, P.C.

[57] ABSTRACT

A suspension apparatus with a pair of hydraulic dampers 1 disposed on left and right sides of a vehicle, an upper end side of which is connected to a vehicle body side and a lower end side is connected to an axle side, and a pressure regulating cylinder 2 communicating with piston side oil chambers a of the pair of hydraulic dampers 1. The pressure regulating cylinder 2 has a free piston 26 slidably disposed within a cylinder body 24 and defining a front side chamber h and a back side chamber i within the cylinder body 24. The free piston 26 is slidably encased in a cylinder member and has a partitioning member 27 for defining a closed chamber j and an open chamber k communicating with a front side chamber h on the inner peripheral side of the free piston 26. The partitioning member 27 has a damping valve 4 which communicates between the closed chamber j and the open chamber k, and has a proximal end connected to an extreme end of a rod body 29 elastically supported on the cylinder body 24. The front side chamber h communicates with a piston side oil chamber a of one hydraulic damper 1. The closed chamber j communicates with a piston side oil chamber a of the other hydraulic damper 1 through a through-hole 29b bored in an axial central part of the rod body 29.

8 Claims, 6 Drawing Sheets

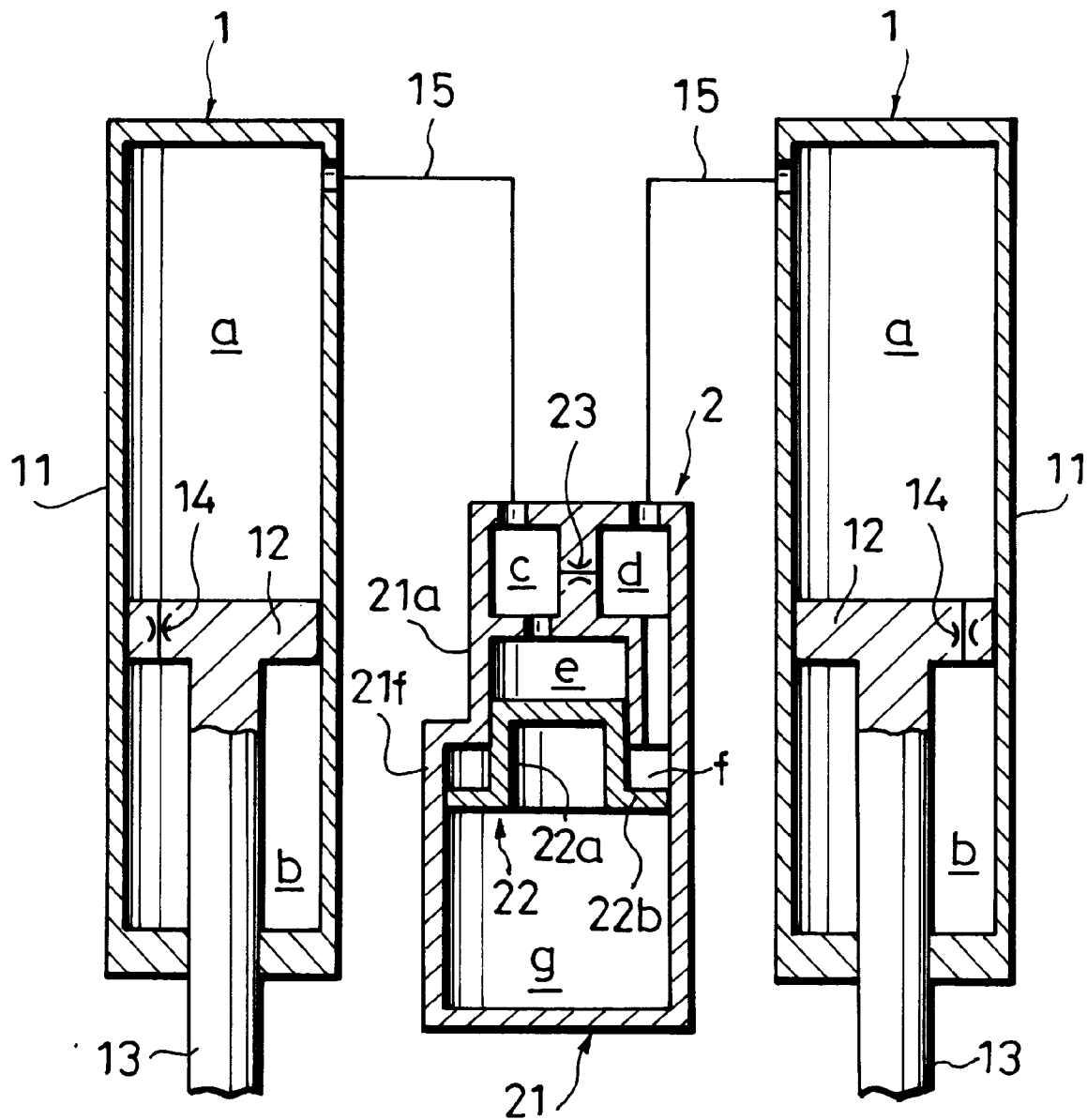

SUSPENSION APPARATUS

FIELD OF THE INVENTION

This invention relates to a suspension apparatus, and more particularly to an improvement in a suspension apparatus set to enable suppression of body vibration in a vehicle during running.

BACKGROUND OF THE INVENTION

Recent suspension apparatus have been proposed not only to support a vehicle body on an axle, while being attended by a damping action, but also to enable suppression of body vibration in a running vehicle.

For example, in a proposal disclosed in Japanese Patent Application Laid-Open No. Hei 8-132846 Publication, as shown in FIG. 8, piston side oil chambers a in a pair of hydraulic dampers 1 and 1 are disposed on left and right sides of a vehicle and communicate with each other through a pressure regulating cylinder 2. When the left and right hydraulic dampers 1 are expanded in phase or out of phase, the body vibration with respect to vertical motion or rolling in the vehicle during running is suppressed by the damping action in the hydraulic dampers 1 and the damping action of the pressure regulating cylinder 2 or the gas spring effect.

As an example, the hydraulic damper 1 slidably encases therein a piston 12 which defines a piston side oil chamber a and a rod side oil chamber b within a cylinder 11 connected on the body side of the vehicle. One end of a piston rod 13 has a proximal end connected to an axle side of the vehicle and another end inserted into the cylinder 11 in such a manner as to be moved in and out is connected to the piston 12.

The piston side oil chamber a in the cylinder 11 communicates with the rod side oil chamber b through a damping valve 14 disposed in the piston 12 and communicates with the interior of the pressure regulating cylinder 2 through an oil path 15 disposed externally.

Normally in the hydraulic damper I of this kind, the piston rod 13 is biased by means of a suspension spring, not shown, so that the piston rod 13 tends to be extended out of the cylinder 11, in a stretching direction.

On the other hand, the pressure regulating cylinder 2 has a cylinder body 21 comprising a two-stage cylinder with a shoulder. Within the pressure regulating cylinder 2, a free piston 22 is slidably encased and comprises a two-stage piston likewise with a shoulder is slidably encased. The pressure regulating cylinder 2 has front chambers c and d which are defined in such a manner as to communicate with external oil paths 15 and 15 and which communicate with each other through a damping valve 23.

Further, the pressure regulating cylinder 2 has a small-diameter oil chamber e defined by a small diameter portion 22a of the free piston 22 within a small diameter portion 21a of the cylinder body 21, and a large-diameter oil chamber f defined by a large diameter portion 22b of the free piston 22 within a large diameter portion 21b of the cylinder body 21. The small-diameter oil chamber e communicates with the front chamber c, and the large-diameter oil chamber f communicates with the front chamber d.

The pressure regulating cylinder 2 has a gas chamber g at the back side of the free piston 22. The gas chamber g is defined by the large diameter portion 21b of the cylinder body 21 and by the large diameter portion 22b of the free piston 22. The gas chamber g has a predetermined gas pressure.

In the free piston 22, a pressure receiving area of the small-diameter oil chamber e is equal to a pressure receiving area of the large-diameter oil chamber f.

Therefore, in the above-described conventional suspension apparatus, when the left and right hydraulic dampers 1 and 1 are, for example, compressed in phase by the vertical motion of the vehicle body, working oil of the piston side oil chamber a flows into the rod side oil chamber b through the damping valve 14. Whereas, working oil corresponding to the entry volume of the piston rod 13 selectively flows into the front chambers c and d in the pressure regulating cylinder 2 through each oil path 15 from each piston side oil chamber a.

In the pressure regulating cylinder 2, working oil from the front chamber c flows into the small-diameter oil chamber e and working oil from the oil chamber d flows into the front chamber f so that the free piston 22 is moved back against gas pressure in the gas chamber g applied on the back side of piston 22.

As a result, during a compression stroke which is in phase, the damping action on the pressure side in the damping valve 14 and the gas spring effect caused by the pressure regulating cylinder 2 is exhibited.

Further, in the stretching stroke which is in phase in the hydraulic damper 1, in contrast with the aforementioned compression stroke, working oil from the rod-side oil chamber b flows out into the piston side oil chamber a through the damping valve 14, and working oil corresponding to the withdrawal volume of the piston rod 13 which is short in the piston side oil chamber a is replenished from the pressure regulating cylinder 2.

As a result, during a stretching stroke which is in phase in the hydraulic damper 1, only the damping action on the stretching side caused by the damping valve 14 in the hydraulic damper 1 is exhibited.

On the other hand, when the left and right hydraulic dampers 1 and 1 are expanded out of phase by rolling of the vehicle body, for example, the left hydraulic damper 1 is compressed, and when the hydraulic damper 1 on the right side in the figure is stretched, the following occurs.

Working oil in the left hydraulic damper 1, corresponding to the entry volume of the piston rod 13 flows out into the front chamber c through the oil path 15 from the piston side oil chamber a. Working oil in the right hydraulic damper 1, corresponding to the withdrawal volume of the piston rod 13, flows into the piston side oil chamber a from the front chamber d in the pressure regulating cylinder 2.

At that time, in the left hydraulic damper 1, working oil from the piston side oil chamber a flows into the rod side oil chamber b through the damping valve 14. In the right hydraulic damper 1, working oil from the rod side oil chamber b flows out into the piston side oil chamber a through the damping valve 14 so that the damping action on the predetermined compressing side or stretching side caused by the damping valve 14 is exhibited.

At that time, since the pressure receiving area in the small-diameter oil chamber e of the free piston 22 is equal to the pressure receiving area in the large-diameter oil chamber f, no gas spring effect is exhibited without the operation of the free piston 22. However a predetermined damping action is caused by the damping valve 23 on the working oil moving from the front chamber c into the front chamber d through the damping valve 23.

As a result, during a stretching stroke which is out of phase in the hydraulic damper 1, a predetermined damping action caused by the damping valve 14 in the hydraulic damper 1 and the damping valve 23 in the pressure regulating cylinder 2 is exhibited.

However, in the above-described conventional proposal, the lowering of cost in the suspension apparatus cannot be expected and it is difficult to provide the apparatus on popular vehicles.

That is, in the above-described proposal, the pressure regulating cylinder 2 has a cylinder body 21 comprising a two-stage cylinder with a shoulder, within which a free piston 22 comprising a two-stage piston likewise with a shoulder is slidably encased.

Therefore, it is necessary that in the free piston 22, of course, a sealability relative to the gas chamber g be secured in the large diameter portion 22b, and a slidability in the small diameter portion 21a and the large diameter portion 21b with respect to the cylinder body 21 be assured.

Accordingly, it is necessary to prevent a backlash of the free piston 22 within the cylinder body 21 and occurrence of a galling phenomenon caused by the backlash, and it is essential to have processing with extremely high precision relative to the free piston 22 and the cylinder body 21.

As a result, it requires much labor and time for producing the free piston 22 and the cylinder body 21. This not only lowers productivity but fails to provide a reduction in cost of the entire suspension apparatus, and makes it difficult to provide the apparatus on the popular vehicles. aside from high class vehicles.

SUMMARY AND OBJECTS OF THE INVENTION

This invention has been accomplished in view of the foregoing. An object of this invention is to provide a suspension apparatus, which enables suppression of body vibration with respect to vertical motion or rolling in a vehicle during running, and which enables a lowering of cost to increase the overall desirability of a new vehicle and is suitable for mounting on vehicles including popular vehicles.

For achieving the aforementioned object, according to this invention, there is fundamentally provided a suspension apparatus comprising a pair of hydraulic dampers disposed on left and right sides of a vehicle, an upper end side of which is connected to a vehicle body side and a lower end side is connected to an axle side. A pressure regulating cylinder communicates with piston side oil chambers of the pair of hydraulic dampers, wherein the pressure regulating cylinder has a free piston slidably disposed within a cylinder body and defines a front side chamber and a back side chamber within the cylinder body. The free piston is slidably encased in a cylinder member and has a partitioning member for defining a closed chamber and an open chamber communicating with a front side chamber on the inner peripheral side of the free piston. The partitioning member has a damping valve which enables communication between the closed chamber and the open chamber and has a proximal end connected to an extreme end of a rod body elastically supported on the cylinder body. The front side chamber communicates with a piston side oil chamber of one hydraulic damper. The closed chamber communicates with a piston side oil chamber of the other hydraulic damper through a through-hole bored in an axial part of the rod body.

More specifically, the free piston is slidably encased in the cylinder body under the presence of the centering spring, or a seal member, in sliding contact with the inner periphery of the cylinder body, is disposed on the outer periphery of the free piston and the back side chamber is formed as a gas chamber. Further, an outer tube is disposed on the outer peripheral side of the cylinder body, and a diaphragm for defining a gas chamber and an oil chamber is disposed in the chamber, the oil chamber being caused to communicate with the back side chamber.

When the front side chamber in the case where the back side chamber is set to the gas chamber, or the back side chamber communicating with the oil chamber defined by the diaphragm is caused to communicate with an oil pressure feed and discharge source disposed externally, level adjustment of a vehicle by the suspension apparatus is enabled through the operation of the oil pressure feed and discharge source.

More specifically, the back side chamber in the pressure regulating cylinder is set to the oil chamber and communicates with an accumulator disposed externally and the oil pressure feed and discharge source. At this time, the seal member in sliding contact with the inner periphery of the cylinder body is disposed on the outer periphery of the free piston to enable utilization of other oil pressure feed and discharge sources, such as an oil pressure feed and discharge source in a power steering mechanism, as the oil pressure feed and discharge source for adjusting the height of the vehicle, thus omitting the provision of an oil pressure feed and discharge source for exclusive use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS In the drawings:

FIG. 8 is a schematic view showing a conventional suspension apparatus.

DESCRIPTION OF THE PREFERRED EMBODIMENT

Figure 1:
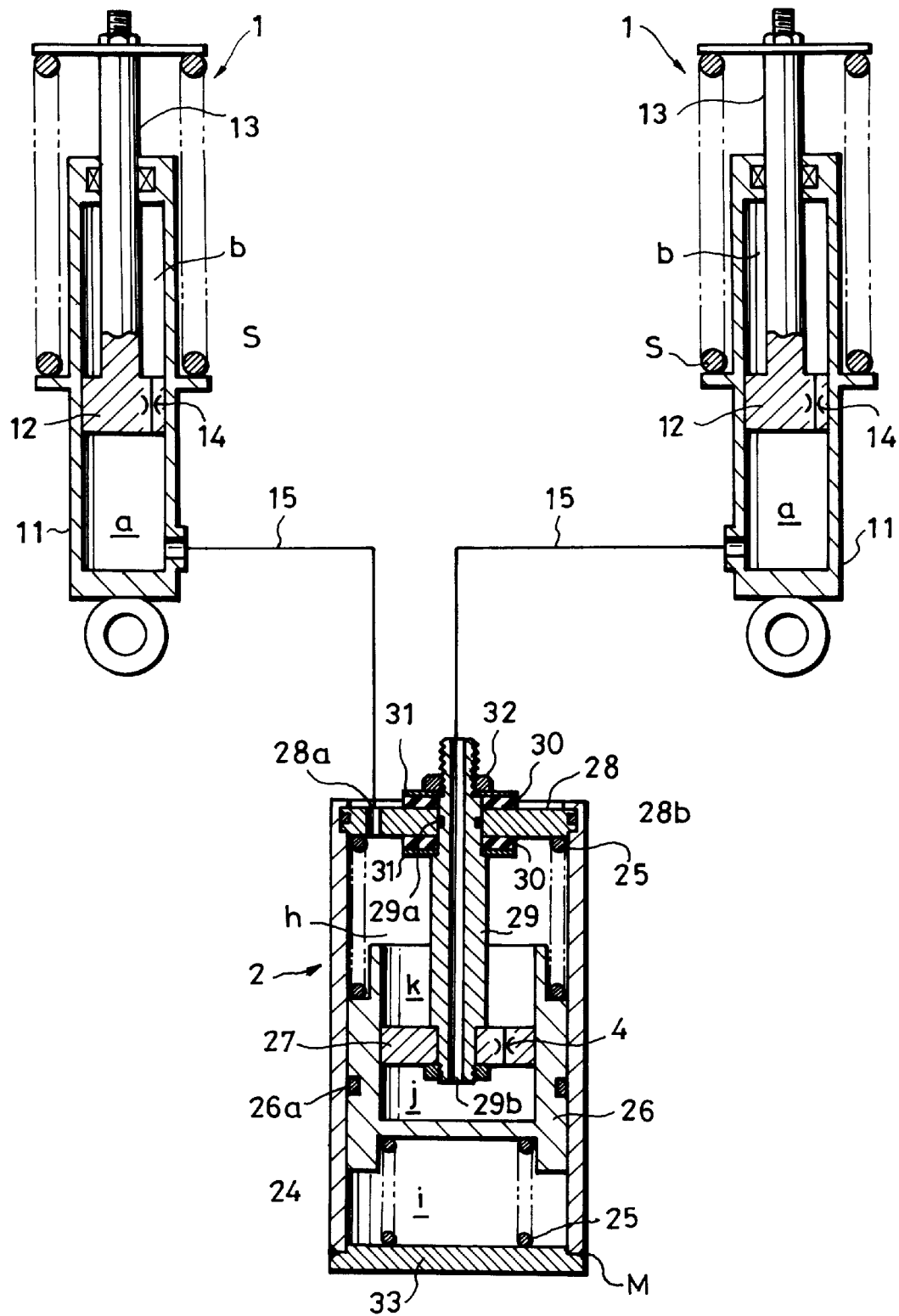
FIG. 1 is a schematic view showing a suspension apparatus according to one embodiment of this invention.

The present invention will be described in detail in accordance with embodiments shown in the drawings. As shown in FIG. 1, the suspension apparatus according to one embodiment of this invention also comprises a pair of hydraulic dampers 1 and 1 disposed on left and right sides of a vehicle. Each of the hydraulic dampers have an upper end connected to a vehicle body and a lower end connected to an axle side. A pressure regulating cylinder 2 communicates with a piston side oil chamber a of each hydraulic damper 1, in a similar manner to the suspension apparatus of this kind heretofore proposed.

Therefore, in the following embodiments, similar structure as in the previously described prior art will be indicated by the same reference numerals in the drawings except necessary parts, and their detailed explanation will be omitted. Features of the present invention will be principally explained.

That is, in the suspension apparatus according to the present invention, the constitution of the pressure regulating cylinder 2 has the feature, aside from the hydraulic damper 1.

In the illustrated embodiment, a suspension spring S is disposed on the hydraulic damper 1, and a piston rod 13 is biased such that it tends to project outwards with respect to the cylinder 11, in a stretching direction. However the suspension spring S may be disposed in a separate arrangement in such a manner as to be placed in parallel with the hydraulic damper 1.

Further, the piston side oil chamber a of the hydraulic damper 1 may extend through the cylinder 11 in such a manner as to be caused to communicate with an oil path 15. However, in place of this, the chamber a may communicate with the oil path 15 by a through-hole bored in an axial part of the piston 12 and the piston rod 13, not shown.

The pressure regulating cylinder 2 according to this embodiment has a free piston 26 which is slidably encased in a cylinder body 24 formed like a single tube under the presence of a centering spring. The centering spring comprising a pair of springs 25 and 25 in the illustrated embodiment. The piston 26 defines a front side chamber h and a back side chamber i within the cylinder body 24.

In the present embodiment, the free piston 26 is constituted to have a seal member 26a on the outer periphery thereof. The outer periphery is in sliding contact with the inner periphery of the cylinder body 24. Whereas the front side chamber h is set to an oil chamber, the back side chamber i is set to a gas chamber. An accumulator A (see FIG. 5) is incorporated into the pressure regulating cylinder 2.

Incidentally, with respect to the centering spring, in the case where the seal member 26a is disposed on the outer periphery of the free piston 26, since a so-called neutral maintenance of the free piston 26 is enabled, the provision of the centering spring may be omitted.

On the other hand, this free piston 26 is fundamentally formed in the form of a normal piston unlike the case of the aforementioned prior art. However, in this embodiment, the free piston 26 is made to serve as a cylinder member on the inner peripheral side of the free piston 26. The cylinder member has a partitioning member 27 slidably encased on the inner peripheral side of the free piston 26 to define a closed chamber j and an open chamber k communicating with the front side chamber h.

The partitioning wall 27 has a damping valve 4 to enable communication between the closed chamber j and the open chamber k. The partitioning wall 27 is connected to an extreme end of a rod body 29 whose proximal end, which is an upper end in the figure, is elastically supported on a head cap member 28. The head cap member closes the cylinder body 24, at an upper end of the cylinder body 24.

Therefore, when working oil from the chamber k flows into the chamber j through the damping valve 4, and working oil from the chamber j flows into the chamber k through the damping valve 4, respectively, they perform the respective predetermined damping action, for example, a damping action of the same characteristics.

Figure 4:
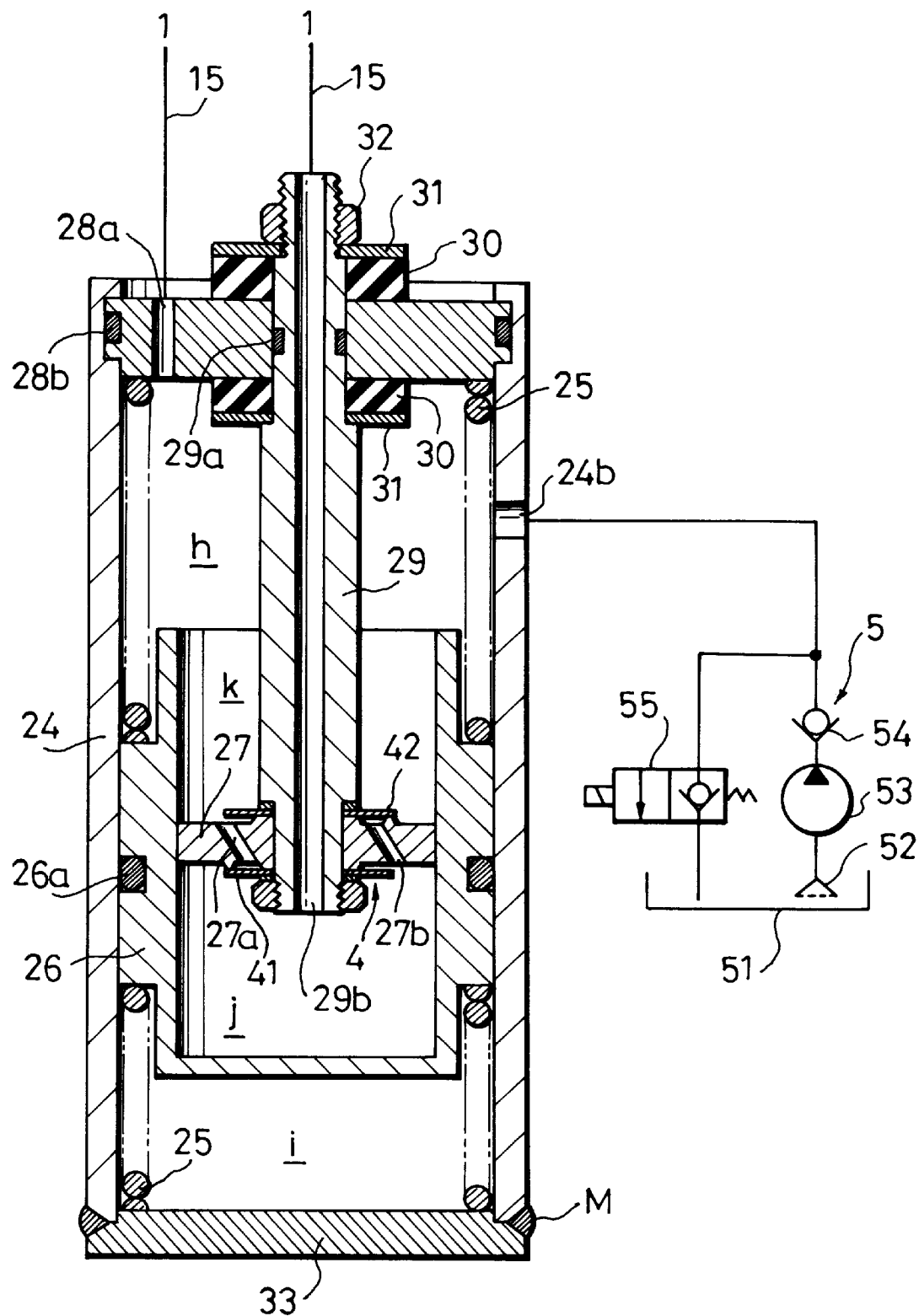
FIG. 4 is a cross-sectional view showing an embodiment of the pressure regulating cylinder in a state in which an oil pressure feed and discharge source shown by a circuit diagram is connected.
Figure 5:
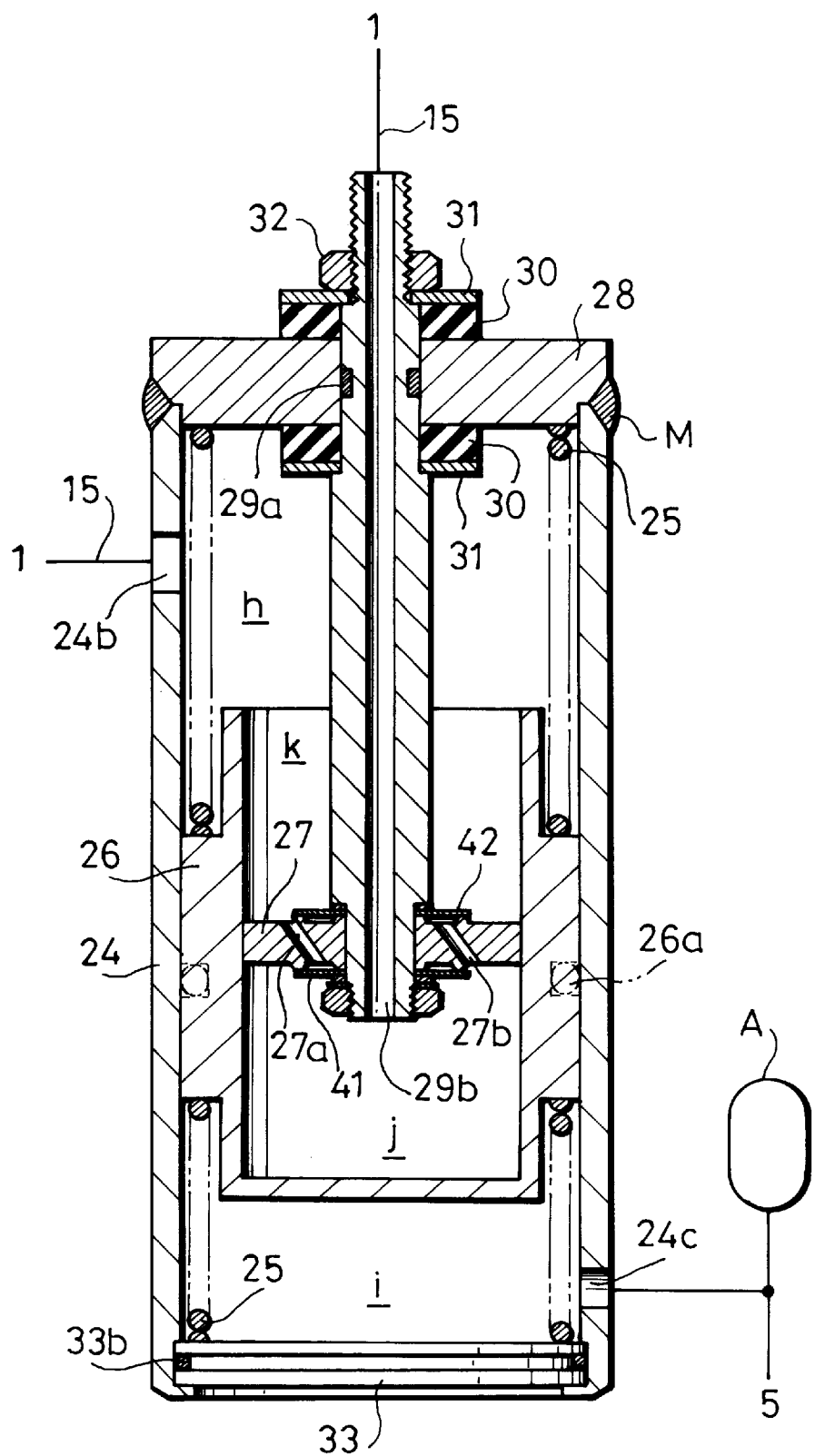
FIG. 5 is a longitudinal sectional view showing another embodiment of the pressure regulating cylinder in a state in which an accumulator and an oil pressure feed and discharge source are connected.

If the damping valve 4 performs a predetermined damping action at the time of reciprocation of working oil between the chambers j and k through the damping valve 4, its construction may be set freely. For example, as shown in the embodiments of FIGS. 4 and 5 described later, there can be provided with an annular leaf valve 41 for closing an open end on the chamber j side of a port 27a bored in the partitioning member 27 to enable communication between the chambers j and k, and an annular leaf valve 42 for closing an open end on the chamber k side of a port 27b likewise bored in the partitioning member 27 to enable communication between the chambers j and k.

A proximal end of the rod body 29, opposite the partitioning member 27, is elastically supported on the head cap member 28. The head cap member 28 closes the upper end of the cylinder body 24 which is in a sense on the fixed side. This elastic supporting construction has a pair of elastic members 30, 30, formed of rubber or the like, disposed in such a manner as to sandwich a central portion of the head cap member 28 from both directions which are vertical directions in the figure. A pair of back-up plates 31, 31 are provided adjacent to each other on the so-called back side of the elastic members 30.

The holding state of the central portion of the head cap member 28 by the elastic members 30 and the back-up plates 31 is maintained by a nut 32 threadedly mounted on the proximal end of the rod body 29.

The nut 32 is threadedly mounted at a torque for preventing occurrence of axial backlash which is vertical in the figure with respect to the head cap member 28 of the rod body 29. The nut is threadedly mounted at a torque which allows oscillation of an extreme end about the proximal end of the rod body 29.

On the outer periphery of the proximal end of the rod body 29 which extends through an insert hole (not indicated by numeral) bored in the central portion of the head cap member 28 is disposed a seal member 29a. The seal member 29a has an outer periphery in close contact with the inner periphery of the insert hole to prevent a so-called pressure slipout.

The free piston 26 is made to serve as a cylinder member so that the partitioning member 27 slidably encased on the inner peripheral side of the free piston 26 is connected to the extreme end of the rod body 29. At this time the proximal end of the rod body 29 is held under the elastic supporting construction, in a way, on the fixed side to thereby enable the partitioning member 27 to have elasticity with respect to the free piston 26, thus preventing occurrence of a galling phenomenon on the inner periphery of the free piston 26 caused by the partitioning member 27.

In the illustrated embodiment, the free piston 26 is slidably encased in the cylinder body 24 in the state in which the seal member 26a is disposed on the outer periphery thereof. When the free piston 26 is formed to have a small diameter, there appears a slight clearance between the free piston 26 and the cylinder body 24. Accordingly, an elastic state can be realized also between the free piston 26 and the cylinder body 24 to prevent a galling phenomenon on the inner periphery of the cylinder body 24 caused by the free piston 26.

Since the free piston 26 is slidably encased in the cylinder body 24 under the presence of the centering spring comprising a pair of springs 25 and 25, the free piston 26 can be returned to a predetermined neutral position in the state in which a slight clearance is present between the free piston 26 and the cylinder body 24, that is, even if a complete sliding contact state is not maintained.

Figure 2:
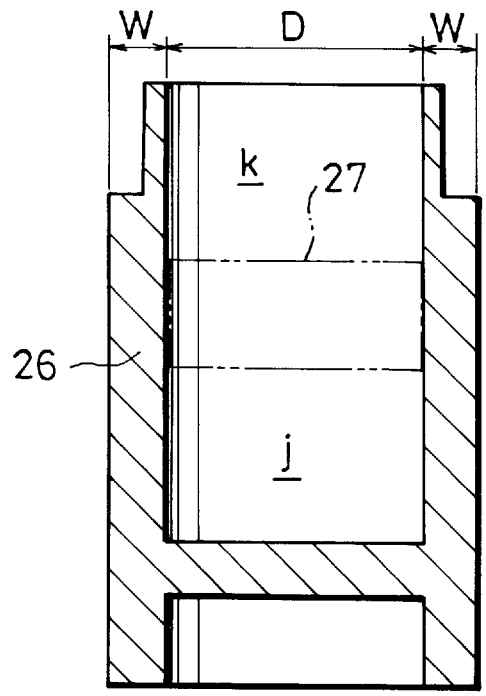
FIG. 2 is an explanatory view showing a relationship of areas of upper and lower ends of a pressure regulating cylinder.

In the illustrated embodiment, a relationship of a pressure receiving area between the free piston 26 and the partitioning member 27 is set such that as shown in FIG. 2 where the presence of the seal member 26a is omitted, a pressure receiving area A1 (not indicated by numeral) in the partitioning member 27 set by a diameter D is equal to a pressure receiving area A2 (not indicated by numeral) in an annular portion set by a width W opposite to the front side chamber h (see FIG. 1).

Therefore, an equation, Pj·A1+Ph·A2=Pi(A1+A2) is established (wherein Pj is pressure of chamber j, Ph is pressure of front side chamber h, and Pi is pressure of back side chamber i) between the front side chamber h and the back side chamber i for communication between the closed chamber j and the open chamber k. Pressure can then be balanced so that the free piston 26 is not slidably moved within the cylinder 24.

Incidentally, in the case of the embodiment shown in FIG. 1, the front side chamber h communicating with the open oil chamber communicates with the oil path 15 through a communication hole 28a bored in the head cap member 28 and communicates with the piston side oil chamber a of one hydraulic damper 1.

Further, the closed chamber j communicates with the oil path 15 through a through-hole 29b bored in the axial part of the rod body 29 and communicates with the piston side oil chamber a of the other hydraulic damper 1.

The upper end of the cylinder body 24 is closed in a liquid-tight state by caulking the upper end of the cylinder body 24 with the head cap member 28 having the seal member 28b disposed on the outer periphery thereof.

The lower end of the cylinder body 24 is closed in an air-tight construction by welding a bottom member 33 (indicated by symbol M in the figure).

Therefore, in the suspension apparatus according to this embodiment formed as described above, when the left and right hydraulic dampers 1 and 1 are, for example, compressed in phase with the vertical motion of the vehicle body, working oil of the piston side oil chamber a flows into the rod side oil chamber b through the damping valve 14.

On the other hand, working oil corresponding to the entry volume of the piston rod 13 selectively flows into the closed chamber j or the front side chamber h in the pressure regulating cylinder 2 through the oil path 15 from the piston side oil chamber a.

That is, working oil from the piston side oil chamber a of one hydraulic damper 1 on the left side in the figure flows into the front side chamber h, and working oil from the piston side oil chamber a of the other hydraulic damper 1 on the right side in the figure flows into the chamber j.

In the pressure regulating cylinder 2, since oil pressure in the front side chamber h and oil pressure in the closed chamber j act on the free piston 26, the free piston 26 is moved back against the gas pressure in the back side chamber i as an accumulator A formed on the back side of the free piston 26.

As a result, during a compression stroke which is in phase in the hydraulic damper 1, a damping action is exhibited on the pressure side and caused by the damping valve 14 in the hydraulic damper 1 and the gas spring effect caused by the accumulator A.

In contrast to the above, in the stretching stroke which is in phase in the hydraulic damper 1, working oil from the rod side oil chamber b flows out into the piston side oil chamber a through the damping valve 14, and working oil corresponding to the withdrawal volume of the piston rod 13 which is short in the piston side oil chamber a is replenished from the pressure regulating cylinder 2.

As a result, during a stretching stroke which is in phase in the hydraulic damper 1, only the damping action on the stretched side, caused by the damping valve 14 in the hydraulic damper 1, is exhibited.

On the other hand, when the hydraulic dampers 1 and 1 on the left and right sides are expanded out of phase by rolling of the vehicle body, for example, when one hydraulic damper 1 on the left side in the figure is compressed and the other hydraulic damper 1 on the right side in the figure is stretched, the following occurs.

In the left hydraulic damper 1, working oil corresponding to the entry volume of the piston rod 13 flows into the closed front side chamber h in the pressure regulating cylinder 2 through the oil path 15 from the piston side oil chamber a. In the right hydraulic damper 1, working oil corresponding to the withdrawal volume of the piston rod 13 flows into the piston side oil chamber a from the chamber j in the pressure regulating cylinder 2.

At this time, in the left hydraulic damper 1, working oil from the piston side oil chamber a flows into the rod side oil chamber b through the damping valve 14; and in the right hydraulic damper 1, working oil from the rod side oil chamber b flows out into the piston side oil chamber a through the damping valve 14 so that damping action on the predetermined pressure side or stretched side is caused by the damping valve 14.

At this time, in the pressure regulating cylinder 2, since both pressure receiving areas in the chambers j and k of the free piston 26 are equal, and are equal to the pressure receiving area of the front side chamber h with respect to the free piston 26, the free piston 26 is not operated. The gas spring effect caused by the accumulator A is not exhibited. However, working oil from the front side chamber h, that is, the open chamber k flows into the closed chamber j through the damping valve 4 disposed on the partitioning member 27 so that the damping action of a predetermined magnitude caused by the damping valve 4 is exhibited.

As a result, in the expansion stroke which is out of phase in the hydraulic damper 1, the damping action caused by the damping valve 14 in the hydraulic damper 1 and the damping action caused by the damping valve 4 in the pressure regulating cylinder 2 is exhibited.

Figure 3:
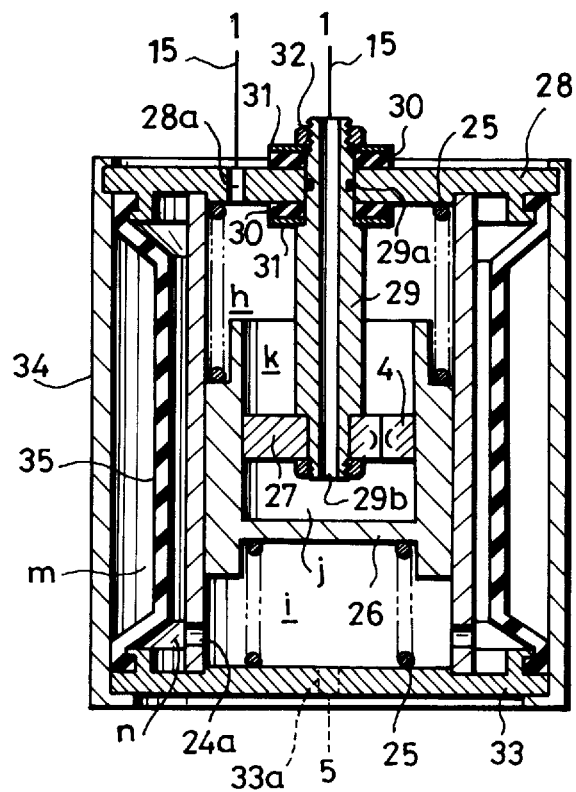
FIG. 3 is a cross-sectional view showing the pressure regulating cylinder according to a further embodiment.

FIG. 3 shows the pressure regulating cylinder 2 according to another embodiment, in which the so-called internal constitution of the pressure regulating cylinder 2 is substantially the same as the case of the embodiment shown in FIG. 1.

Therefore, similar structure to the above will be indicated by the same reference numerals in the drawings, and the detailed explanation will be omitted. Features of the present invention will be principally explained.

That is, in the pressure regulating cylinder 2, an outer tube 34 is disposed on the outer peripheral side of the cylinder body 24 to form a tubular chamber (not shown), the tubular chamber being internally provided with a substantially tubular diaphragm 35 for defining a gas chamber m and an oil chamber n.

The oil chamber n is caused to communicate with a back side chamber i set in an oil chamber defined by the free piston 26 within the cylinder body 24 through a lower communication hole 24a bored in the cylinder body 24.

While in this embodiment, the provision of the seal member 26a on the outer periphery of the free piston 26 is omitted since the back side chamber i is set in the oil chamber. It is to be noted that in place of this, the seal member 26a may be disposed as shown by the imaginary line in FIG. 5.

Further, in this embodiment, the upper and lower ends of the bottom member 33 and the cylinder body 24 are closed by caulking the upper and lower ends of the outer tube 34, by means of the head cap member 28 and the bottom member 33. However, since the outer peripheral ends of the head cap 28 and the bottom member 33 hold the upper and lower ends of the diaphragm 35 between it and the outer tube 34, the upper and lower ends of the diaphragm 35 exhibit the sealing function so that the provision of the sealing member on the outer periphery of the head cap member 28 and the bottom member 33 can be omitted.

Therefore, in this embodiment, the accumulator A is held on the outer periphery of the pressure regulating cylinder 2, which enables shortening of dimension in the pressure regulating cylinder 2 as compared with the case of the embodiment shown in FIG. 1.

FIG. 4 shows the pressure regulating cylinder 2 according to still another embodiment, in which the pressure regulating cylinder 2 has its structure substantially the same as the embodiment shown in FIG. 1.

Therefore, similar structure to that former embodiments will be indicated by the same reference numerals in the drawings, and the detailed explanation will be omitted. Features of the present invention will be principally explained.

That is, in the pressure regulating cylinder 2, the front side chamber communicates with the oil pressure feed and discharge source 5 disposed externally through a communication hole 24b bored in the cylinder body 24. The full length in the hydraulic dampers 1 and 1 can be adjusted by the operation of the oil pressure feed and discharge source 5. The height of the vehicle body in the vehicle can be adjusted.

According to the illustrated embodiment, in the oil pressure feed and discharge source 5, working oil from a tank 51 is pumped up by a pump 53 through a filter 52 and supplied to the front side chamber h through a check valve 54. Whereas working oil from the front side chamber h is returned to the oil tank 51 through an on/off valve 55.

In the illustrated embodiment, as previously mentioned, the damping valve 4 has an annular leaf valve 41 for closing an open end on the chamber j side of a port 27a bored in the partitioning member 27 to enable communication between the chambers j and k. The damping valve 4 also has an annular leaf valve 42 for closing an open end on the chamber k side of a port 27b bored in the partitioning member 27 to enable communication between the chambers j and k.

Therefore, in the suspension apparatus having the pressure regulating cylinder 2 according to this embodiment, the height of the vehicle can be adjusted by the adjustment of the full length of the hydraulic dampers 1 and 1 in the following manner.

In the case where adjustment is made to have a high vehicle level by which the vehicle body is raised with respect to the axle, pressurized oil is supplied to the front side chamber h by driving the pump 53. This raises gas pressure within the back side chamber i including the accumulator A (not shown). Overall in the pressure regulating cylinder 2 is increased.

As a result, in the hydraulic damper 1, reaction of the piston rod 13 is increased so that the piston rod 13 is projected by a length corresponding thereto from the cylinder 11 to move up the body of the vehicle, that is, to adjust the height or length to the high level.

The state of the high vehicle level realized as described above is maintained by stopping the drive of the pump 53, in a manner such that working oil from the front side chamber h is prevented from returning to the tank 51 by the on/off valve 55 and the check valve 54.

Next, in the case where adjustment is made to lower a vehicle level, in contrast to the above, that is to have a low vehicle level, the on/off valve 55 is switched to a so-called drain position to release oil pressure of the front side chamber h, that is, oil pressure of the pressure regulating cylinder 2 to the tank 51.

Thereby, the back side chamber i, with the accumulator A, is expanded to a lower pressure in the pressure regulating cylinder 2, as a consequence of which a reaction of the piston rod 13 is reduced in the hydraulic damper 1, and the piston rod 13 is moved into the cylinder 11 by a length corresponding thereto so that the body of the vehicle is lowered. That is, the level is adjusted to a low vehicle level.

As described above, in the suspension apparatus according to this embodiment, the full length of the hydraulic dampers 1 and 1 can be adjusted by the operation of the oil pressure feed and discharge source 5 to adjust the height of the vehicle. This will apply to the case of the embodiment shown in FIG. 3.

As shown by the broken line in FIG. 3, the back side chamber i as the oil chamber is caused to communicate with the external oil pressure feed and discharge source 5 through a communication hole 33a bored in the bottom member 33, thus enabling the adjustment of the vehicle level similar to that as described above, FIG. 5 shows the pressure regulating cylinder 2 according to a further embodiment, in which the pressure regulating cylinder 2 has structure which is substantially the same as the case of the embodiment shown in FIG. 4.

Therefore, similar as those of the above will be indicated by the same reference numerals in the drawings, and the detailed explanation will be omitted. Features of the present invention will be principally explained.

In the pressure regulating cylinder 2, the back side chamber i is set in the oil chamber, and the back side chamber i is caused to communicate with the accumulator A disposed externally and the oil pressure feed and discharge source 5 shown merely by numeral. The full length of the hydraulic dampers 1 and 1 can be adjusted by the operation of the oil pressure feed and discharge source 5, that is, the height of the vehicle can be adjusted.

In this embodiment, the head cap member 28 is connected to the upper end of the cylinder body 24 by welding (indicated by symbol M), and the bottom member 33 is connected to the lower end of the cylinder body 24 by caulking the lower end of the cylinder body 24 through the intervention of the sealing member 33b on the outer periphery thereof.

Further, in this embodiment, the front side chamber h communicates with the oil path 15 through the communication hole 24b bored in the cylinder body 24, and the back side chamber i communicates with the oil pressure feed and discharge source 5 side through the communication hole 24c bored in the cylinder body 24.

As described above, also in this embodiment, the height of the vehicle can be adjusted. In this embodiment, however, the sealing member 26a may be disposed on the outer periphery of the free piston 26, as shown by the imaginary line in the figure. In this case, the sealing member 26a enables separation between the front side chamber h and the back side chamber i defined by the free piston 26, so that oil properties between the hydraulic damper 1 side and the oil pressure feed and discharge source 5 side can be utilized as working oil.

As a result, though not shown, for example, the oil pressure feed and discharge source 5 can be used jointly with an oil pressure feed and discharge source constituting a power steering apparatus in the vehicle to simplify the constitution of the entire suspension apparatus.

Figure 6:
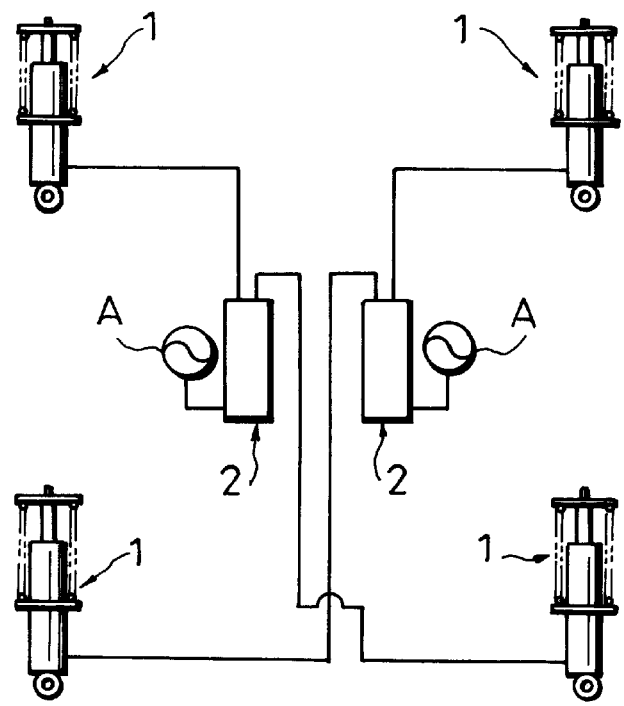
FIG. 6 is a schematic view showing one embodiment of arrangement of the suspension apparatus according to this invention onto a vehicle.

FIG. 6 shows an embodiment in which the suspension apparatus constructed as described above is mounted on a four-wheel car. In this embodiment, the hydraulic damper 1 is disposed on each of the four wheels of the vehicle, and two pressure regulating cylinders 2 are disposed. The hydraulic dampers 1 positioned at a diagonal line are caused to communicate through a single pressure regulating cylinder 2.

In the drawing, the oil pressure feed and discharge source 5 caused to communicate with the pressure regulating cylinder 2 and the accumulator A is not shown. This will apply to the case shown in FIG. 7.

In the embodiment shown in FIG. 6, by the suspension apparatus according to the present invention, the vertical vibration control and the rolling control in the vehicle can be made as a matter of course, and not only the adjustment of vehicle height in four wheels of the vehicle is possible but also the control of pitching in the vehicle is possible, thus enabling improvement in ride comfort and enhancement of driving stability in the vehicle during running.

Figure 7:
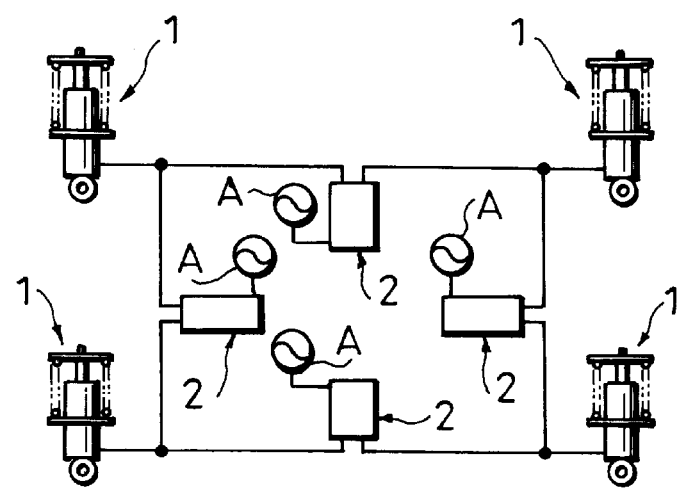
FIG. 7 is a schematic view showing a further embodiment of arrangement of the suspension apparatus according to this invention onto a vehicle.

FIG. 7 shows a further embodiment in which the suspension apparatus constructed according to the present embodiment is mounted on a four-wheel car. In this embodiment, the hydraulic damper 1 is disposed on each of the four wheels of the vehicle, and four pressure regulating cylinders 2 are disposed. A single hydraulic damper 1 is caused to communicate with two pressure regulating cylinders 2.

Therefore, in the present embodiment, by the suspension apparatus of the present invention, not only the adjustment of vehicle height in four wheels of the vehicle is possible but also the vertical vibration control and the rolling control in the vehicle can be made as a matter of course, and the control of pitching in the vehicle is possible. Furthermore, the damping characteristics for the rolling control and the pitching control can be independently set.

As described above, according to the present invention, the pressure regulating cylinder with the cylinder body is formed of a single tube, and formation of the cylinder body is easy. Further, formation of the free piston disposed within the cylinder body is also easy. Moreover, since a neutral position of the free piston within the cylinder body is maintained by the centering spring disposed within the cylinder body, a sliding contact resistance between the cylinder body and the free piston can be greatly lowered to assure an operating performance. In addition, a high processing accuracy for the cylinder body and the free piston is not required, and the productivity can be enhanced without requiring labor and time for processing, thus enabling the lowering of cost of the entire suspension apparatus.

Further, in the present invention, since the partitioning member for making the free piston is a cylinder member elastically supported on the cylinder body side, there is no fear of a galling phenomenon of the partitioning member relative to the free piston in securing a predetermined liquid-tight property, thus enabling assurance of a predetermined exhibition of function in the prescribed manner.

Furthermore, in the present invention, since the accumulator is provided jointly with the pressure regulating cylinder, the accumulator need not be disposed in the form of the so-called separate arrangement. The mounting of the suspension apparatus on the vehicle is enhanced. Particularly, in the case where the accumulator is disposed on the outer peripheral side of the pressure regulating cylinder, the entire apparatus enables compactness to further enhance the mounting thereof on the vehicle.

Moreover, in the present invention, in the case where the sealing member is disposed on the outer periphery of the free piston to separate the front side chamber from the back side chamber, different working oil between the hydraulic damper side and the oil pressure feed and discharge source side can be utilized. For example, the oil pressure feed and discharge source can be used jointly with the oil pressure feed and discharge source constituting the power steering apparatus in the vehicle to simplify the constitution of the entire suspension apparatus.

As a result, the present invention provides advantages in that the suppression of the vertical motion and rolling in the vehicle, and in addition, the vehicle vibrations with respect to the pitching becomes enabled, the cost can be lowered, the generality can be enhanced, and the apparatus can be optimally applied to a variety of vehicles including popular vehicles.

While specific embodiments of the invention have been shown and described in detail to illustrate the application of the principles of the invention, it will be understood that the invention may be embodied otherwise without departing from such principles.

What is claimed is:

1. A suspension apparatus comprising a pair of hydraulic dampers disposed on left and right sides of a vehicle, an upper end side of which is connected to a vehicle body side and a lower end side is connected to an axle side, and a pressure regulating cylinder communicating with piston side oil chambers of the pair of hydraulic dampers, wherein the pressure regulating cylinder has a free piston slidably disposed within a cylinder body and defining a front side chamber and a back side chamber within the cylinder body, the free piston being slidably encased in a cylinder member and having a partitioning member for defining a closed chamber and an open chamber communicating with a front side chamber on the inner peripheral side of the free piston, the partitioning member having a damping valve which enables communication between the closed chamber and the open chamber and having a proximal end connected to an extreme end of a rod body elastically supported on the cylinder body, the front side chamber being caused to communicate with a piston side oil chamber of one hydraulic damper, and the closed chamber being caused to communicate with a piston side oil chamber of the other hydraulic damper through a through-hole bored in an axial part of the rod body.

2. The suspension apparatus according to claim 1, wherein the free piston is slidably encased within the cylinder body under the presence of a centering spring.

3. The suspension apparatus according to claim 1, wherein a sealing member in sliding contact with on inner periphery of the cylinder body is disposed in an outer periphery of the free piston, and the back side chamber is set in a gas chamber.

4. The suspension apparatus according to claim 3, wherein the front side chamber is caused to communicate with an oil pressure feed and discharge source disposed externally.

5. The suspension apparatus according to claim 1, wherein an outer tube is disposed on the outer periphery side of the cylinder body to form a chamber, and a diaphragm for defining a gas chamber and an oil chamber is disposed within the chamber, the oil chamber being caused to communicate with the back side chamber.

6. The suspension apparatus according to claim 5, wherein the back side chamber is caused to communicate with the oil pressure feed and discharge source disposed externally.

7. The suspension apparatus according to claim 1, wherein the back side chamber is set in the oil chamber and caused to communicate with an accumulator and the oil pressure feed and discharge source disposed externally.

8. The suspension apparatus according to claim 7, wherein a sealing member in sliding contact with an inner periphery of the cylinder body is disposed on an outer periphery of the free piston.

* * * * *